United States Patent [19]
Alves, Jr.

[11] Patent Number: 5,153,598
[45] Date of Patent: Oct. 6, 1992

[54] GLOBAL POSITIONING SYSTEM TELECOMMAND LINK

[76] Inventor: Daniel F. Alves, Jr., 896 Blake St., Santa Maria, Calif. 93455

[21] Appl. No.: 765,680

[22] Filed: Sep. 26, 1991

[51] Int. Cl.$^5$ ............................................. H04B 7/185
[52] U.S. Cl. .................................... 342/352; 342/357; 375/1
[58] Field of Search ........................ 342/352, 356, 357; 375/1

[56] References Cited

U.S. PATENT DOCUMENTS

| | | | |
|---|---|---|---|
| 4,726,224 | 2/1988 | D'Ausilio | 73/167 |
| 4,912,645 | 3/1990 | Kakihara et al. | 364/449 |

*Primary Examiner*—Theodore M. Blum
*Attorney, Agent, or Firm*—Monty Koslover

[57] ABSTRACT

An improvement to the present system of Global Positioning System of satellites and ground stations, adding the capability of transmitting and receiving telecommand information, when required, to the current Navigation information. Three alternate embodiments are proposed. The first approach utilizes a spread-spectrum transmission of the command message, requiring few added components to the transmitter, and additional despread components to the receiver to extract the telecommand message. The second approach is simpler. Here the telecommand message is transmitted on a single frequency signal which is not modulated by a spreading code. The additional hardware in the receiver is a simple detector and demodulator. The third approach is based on redefining portions of the present GPS Navigation message to include telecommand information bits. No additional transmitter components are required, and only a command demultiplexer is added to the receiver.

Advantages of the invention include a great reduction in required power, volume and weight of satellites and unmanned vehicles, as well as greater control and security of command signals.

3 Claims, 5 Drawing Sheets

GLOBAL POSITIONING SYSTEM TELECOMMAND LINK

BACKGROUND AND SUMMARY OF THE INVENTION

This invention relates to radio systems for communicating information to aerial satellites or unmanned vehicles, both in transmission and receiving.

The Global Positioning System (GPS) of satellites and pseudo-satellite ground stations is designed to provide very accurate Time, Space and Position Information (TSPI) throughout the entire world. The GPS is also being used to provide this information to unmanned vehicles, such as rockets and missiles operating on test ranges throughout the United States, as a replacement/adjunct for tracking radar as well as a form of guidance.

Almost all unmanned aerial vehicles have some sort of on board telecommand receiver for reasons of range safety or for remote control. At present, telecommand information to such receivers is normally provided through dedicated radio frequency links. Typically, telecommand is accomplished using a dedicated UHF channel located between the 406 MHz and 549 MHz frequencies, with the commands themselves taking the form of frequency modulated audio tone pairs. Each test range is provided its own frequency (or frequencies) so as not to interfere with other test ranges. For example, one range may be assigned 425.5 MHz for telecommands, and another range may be assigned 409 MHz for telecommands.

What this means is that any program that requires telecommand support cannot easily be moved among test ranges. The command receivers would have to be retuned to work on the different ranges, and there is no effective easy way for a vehicle to fly through more than one range in any one operation. To do this, essentially one range must be prime, and the other range's telecommand assets must be retuned, something that cannot be done in real time.

Additionally, the 406 MHz to 549 MHz band is not dedicated to the telecommand function. While 406.5 Mhz to 420 MHz are dedicated to flight termination, the entire band is assigned to many other users, Government and private. For instance, the SARSAT ELT frequency is 406 MHz, amateur communications can be found between 420 MHz and 450 MHz, and UHF channel 14 begins at 450 MHz. At the present time, telecommand exists in the band only on a waiver, which is due to expire in 1995.

A solution to the above problems of providing telecommand signals to unmanned aerial vehicles is proposed by this invention. It is proposed to use the GPS satellites and ground stations for telecommand, with some additional components and/or software to existing range application designs, both on the transmission and reception ends. The use of the GPS by the telecommand function will in no way impact the use of the GPS by its other users. Three alternate system design improvements, together with their required command signal transmission and receiving paths, are described. In each case, the normal GPS clear/acquisition (C/A) frequencies are used for the telecommand signal.

In the first preferred improvement, the telecommand signal is transmitted as a direct spread (DS) signal at one of three GPS C/A frequencies. At the GPS receiver end onboard the unmanned vehicle, the received signal passes through added components, is despread out and demodulated to produce the command message for its destination.

In the second alternate improvement, the telecommand signal is transmitted without being modulated by a spreading code. At the GPS receiver only an added detector and demodulator are required to produce the command message for its destination.

Finally, in the third alternate improvement, the GPS Navigation message is redefined to include a telecommand signal. At the GPS receiver the demodulator circuitry is modified to recognize and produce the command message.

Accordingly, it is an object of the present invention to provide a means of moving the telecommand signals out of the crowded 406 MHz to 549 MHz band, by providing an integrated GPS TSPI/Telecommand system.

Another object is to enable the use of a single telecommand frequency for unmanned vehicles flying over more than one test range, providing a universally compatible telecommand capability.

Advantages include the reduction of hardware needed onboard unmanned vehicles by elimination of antennas, cabling, receivers and power supplies associated with a separate command receiver.

Further objects and advantages of the present invention will become apparent from the study of the following portion of the specification, the claims and the attached drawings.

DESCRIPTION OF THE PREFERRED AND ALTERNATE EMBODIMENTS

The purpose of this invention is to transmit command information to unmanned vehicles, using the Global Positioning System (GPS), which otherwise is used solely to provide Time and Space Position Information (TSPI) for users. Therefore, FIG. 1 illustrates an improvement to a typical GPS receiver 10, made by adding telecommand components 15 to achieve receipt and separation of a telecommand message.

The typical GPS receiver 10 is after Dr. J. J. Spilker, Jr., in the paper "GPS Signal Structure and Performance Characteristics", Vol. 1, Global Positioning System, 1980, published by The Institute of Navigation, Washington, D.C.

Figure 1:
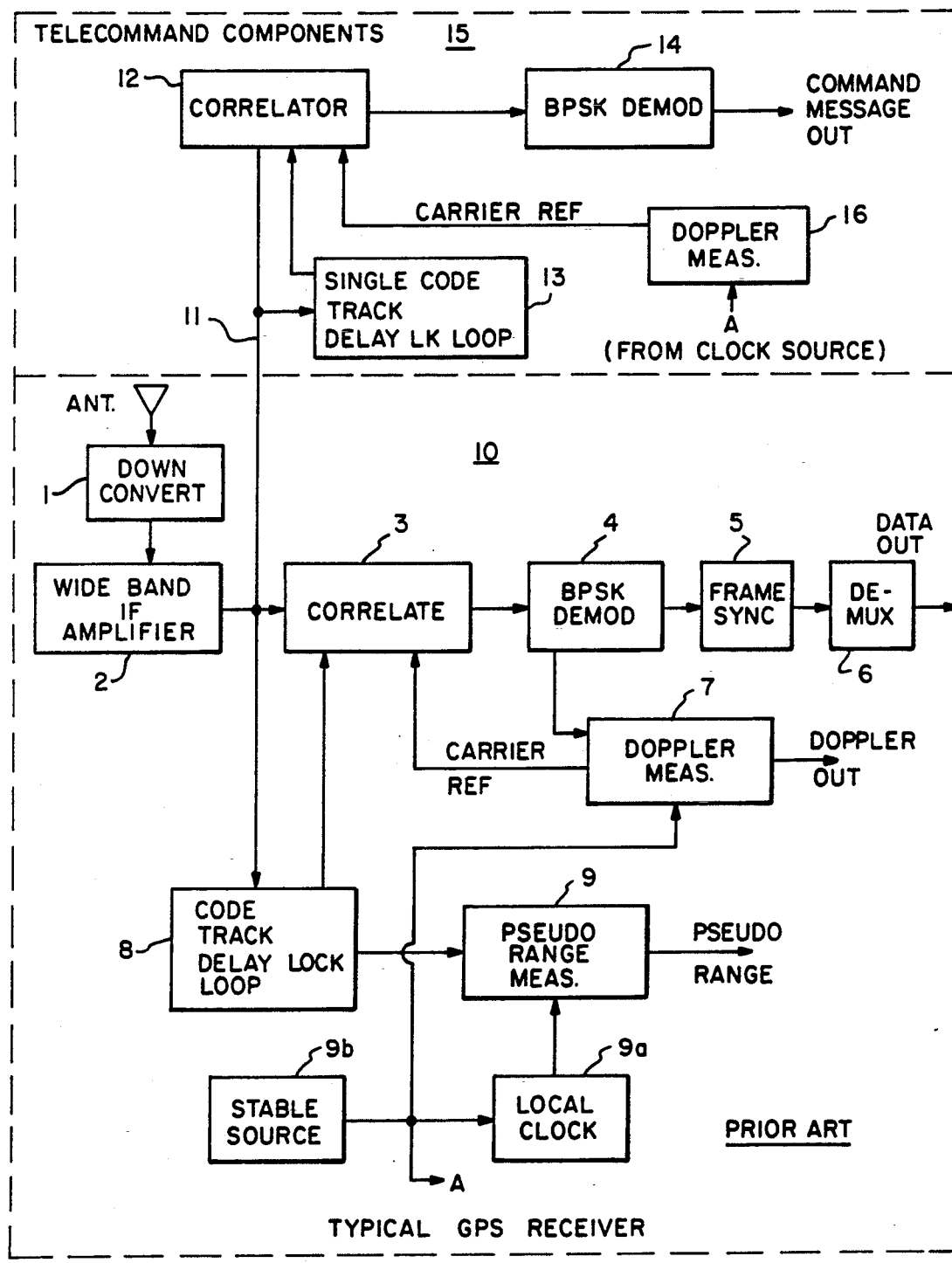
FIG. 1 is a block diagram of the first preferred embodiment of the invention, particularly showing a typical GPS receiver in the lower drawing area, and the proposed added components for telecommand in the upper drawing area.

As shown in FIG. 1, the receiver antenna feeds into a Down Converter 1 and a wide band IF amplifier 2. The received signal then follows the functions of correlation 3, BPSK demodulation 4, frame synchronization 5 and de-multiplexing 6 to produce the data message. Along the way, the doppler measurement 7 is extracted and the carrier referred back to the correlator 3. A code tracking delay lock loop 8, pseudorange measure 9 and clocks 9a, 9b provide timing to the receiver system.

Telecommand components 15 are added to the GPS receiver circuit 10 to process and extract the telecommand message. The added components comprise a correlator 12, a single code track delay-lock loop 13, a doppler measure 16 and a BPSK demodulator 14. Both the correlator 12 and the delay-lock loop 13 are connected to the output of the GPS receiver wide band IF amplifier 2. The doppler measure 16, which provides a carrier reference signal to the correlator 12, is connected to the clock source 9b of the GPS receiver 10.

The correlator 12, delay-lock loop 13 and doppler 16 form a despread and filter circuit for the received spread-spectrum telecommand message, and pass the despread, modulated message to the binary phase shift keyed (BPSK) demodulator 14. The demodulator 14 demodulates the telecommand message for use.

Figure 2:
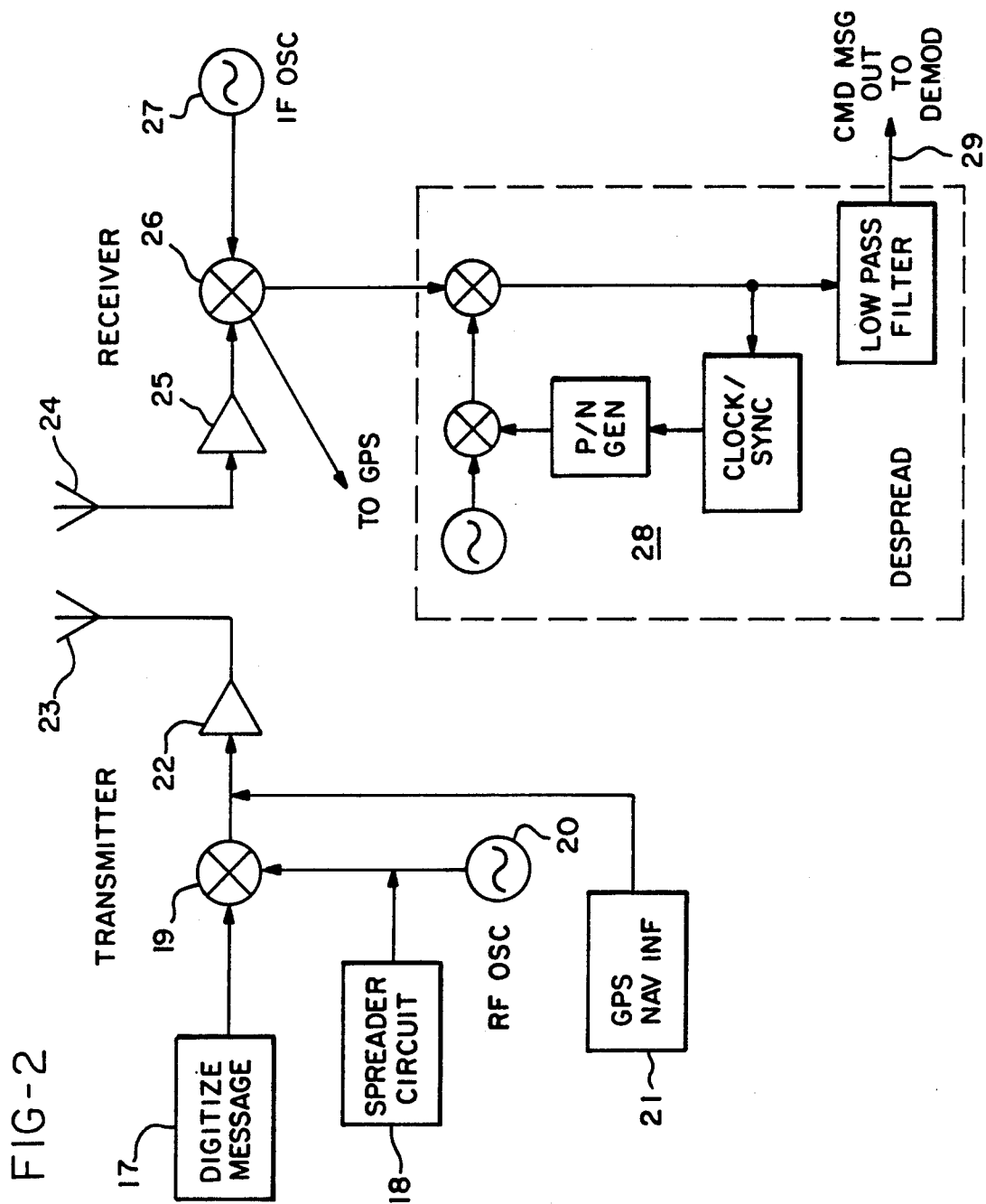
FIG. 2 is a block diagram illustrating the transmitter added functions required for transmission of spread-spectrum telecommand signals, and the receiver signal flow used in the first preferred embodiment invention.

Referring now to FIG. 2, the required added telecommand functions to the GPS transmitter for the preferred embodiment are illustrated, along with the signal flow in the receiver. For the added telecommand functions in the transmitter, the following processing components are needed: a digitizer circuit means 17 for digitizing the input message, a spreader circuit means 18, a mixer 19, and an RF oscillator 20.

The digitized telecommand message 17 is sent as a direct sequence (DS) spread signal using a Gold or similar code. The RF oscillator 20 oscillates at one of three pre-selected frequencies; L1 (1575.42 MHz), L2 (1227.6 MHz) and L3 (1381.05 MHz). Typically, the frequency selected might be the L1 frequency (1575.42 MHz) used by the GPS C/A signal.

The spreader circuit means 18 is connected to, and synchronized with the clock in the GPS transmitter circuit in order to ensure compatibility with the GPS NAV information message normally being transmitted at the same time. The spreader circuit 18 generates a spread-spectrum signal which is input to the mixer 19 together with the oscillator 20 signal. At the mixer 19, the input telecommand message and the spreader circuit inputs are processed to produce a spread-spectrum telecommand message signal for connection to the GPS transmitter circuit wide band amplifier 22.

The amplifier 22 amplifies both the telecommand signal and the normal, spread GPS NAV information 21, before transmitting the combined signals by antenna 23.

At the GPS receiver antenna 24, the signal is down converted and amplified 25 before being put into a mixer 26. The combined signal is split, with the GPS NAV message going to the remainder of the Correlator 3 of the GPS system, and the spread Telecommand message going to the despread circuitry 28 of the telecommand added components 15. In the despread circuitry 28, the correlator 12 is composed of a mixer followed by a low pass filter and is used to identify and detect signals with the desired spreading code. The desired signal will have a strong match with the locally generated pseudonoise (PN) code and will yield a large, digitized output 29 from the correlator. The digitized command message signal is then passed to a BPSK demodulator where the command message is extracted for use.

An advantage of using the proposed system for telecommand transmission and receiving, is that it is no longer necessary for the telecommand transmitter to broadcast at high power to avoid interference. The use of pseudorandom noise (PRN) codes and spread-spectrum modulation techniques provide the protection. For ease in fabrication and use, the form of the command message could be in the same form as the GPS data message, e.g. 50 bps BPSK. It does not have to be in any particular format, however. The commands could use the existing IRIG audio tone-pair format or the so-called secure High Alphabet tone-pair used by the Space Shuttle. This invention, by abandoning the present UHF telecommand system, could lead to the development of an updated digital command message format, incorporating modern techniques to enhance intelligibility under all circumstances.

To discriminate between several vehicles in flight at the same time, different DS codes could be used, assigning one DS code uniquely to one vehicle. Another possible option for discrimination is to use L2 (1227.6 MHz) for the second vehicle and/or L3 (1381.05 MHz) for a third vehicle.

If a translator is used on board a flight vehicle, receiving the commands, as is most likely, the command recognition and processing circuitry must be incorporated into the design. It will resemble a single channel GPS receiver, except that the correlator 12 will only be programmed to recognize one DS code; the code assigned for telecommand usage. Such circuitry now exists in sizes of less than ten cubic inches.

The transmission system can be a special purpose transmitter which resembles a pseudosatellite, or it may be a true ground station with command capability as an added feature. It is also conceivable that future satellites might incorporate the capability of relaying telecommand signals. This would call for the capability to transmit different DS spreading on command.

Figure 3:
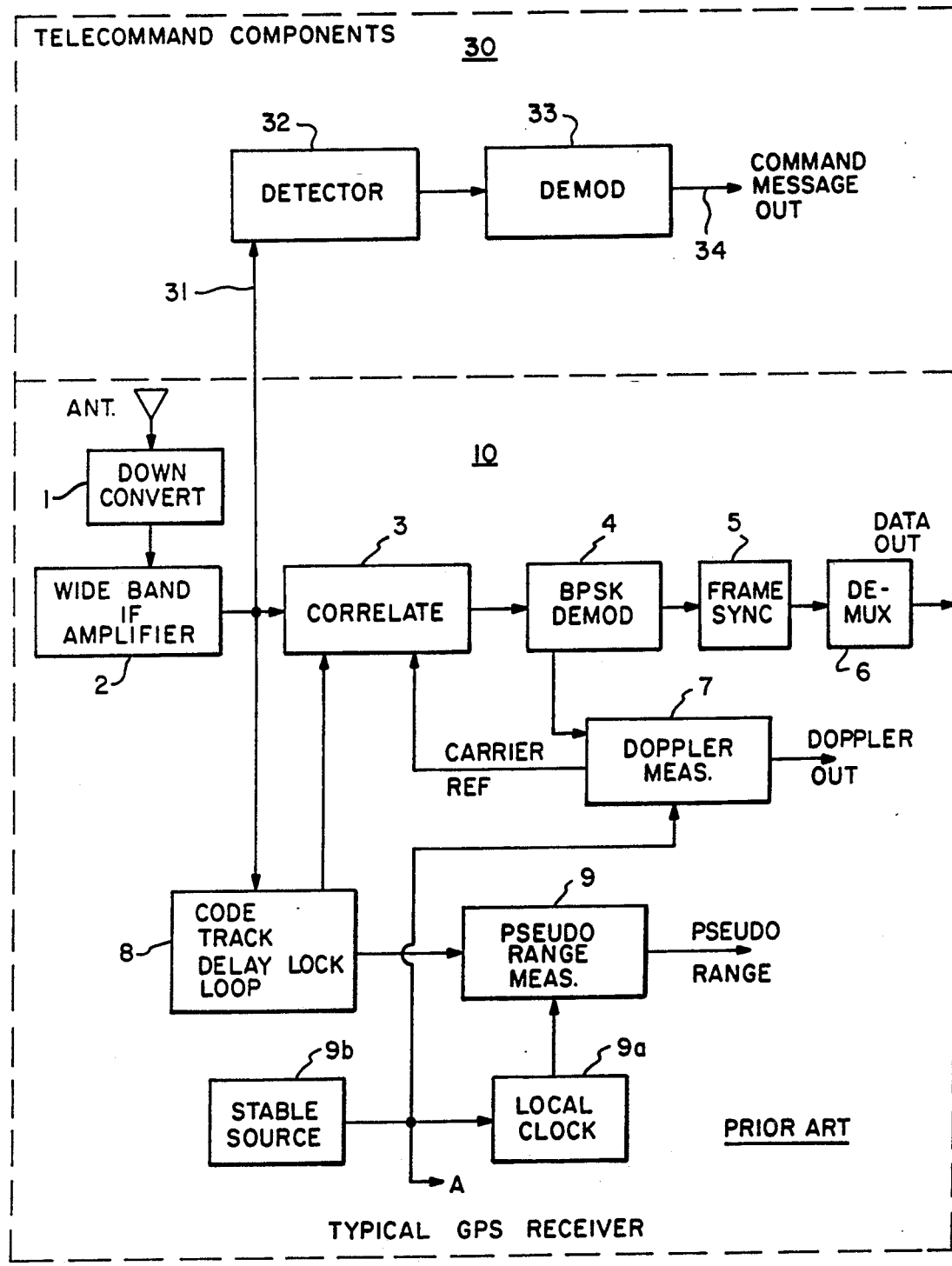
FIG. 3 is a block diagram of the second, alternate embodiment of the invention, particularly showing proposed telecommand components added to a typical GPS receiver.

An alternate embodiment of the improvement, also enabling use of the GPS system for telecommand messages, is depicted in the block diagram of FIG. 3.

In this case, the improvement is simpler and faster acting than in the first preferred embodiment. In the GPS receiver, the added telecommand processing components 30 are a detector circuit 32 and a demodulator circuit 33 in series, with the detector connected 31 to the output of the GPS receiver 10 wide band IF amplifier 2. The detector circuit 32 performs a discriminating function on the received signal, separating out the modulated telecommand message and presenting it to the demodulator 33. The demodulator 33 produces the telecommand message for use 34.

Figure 4:
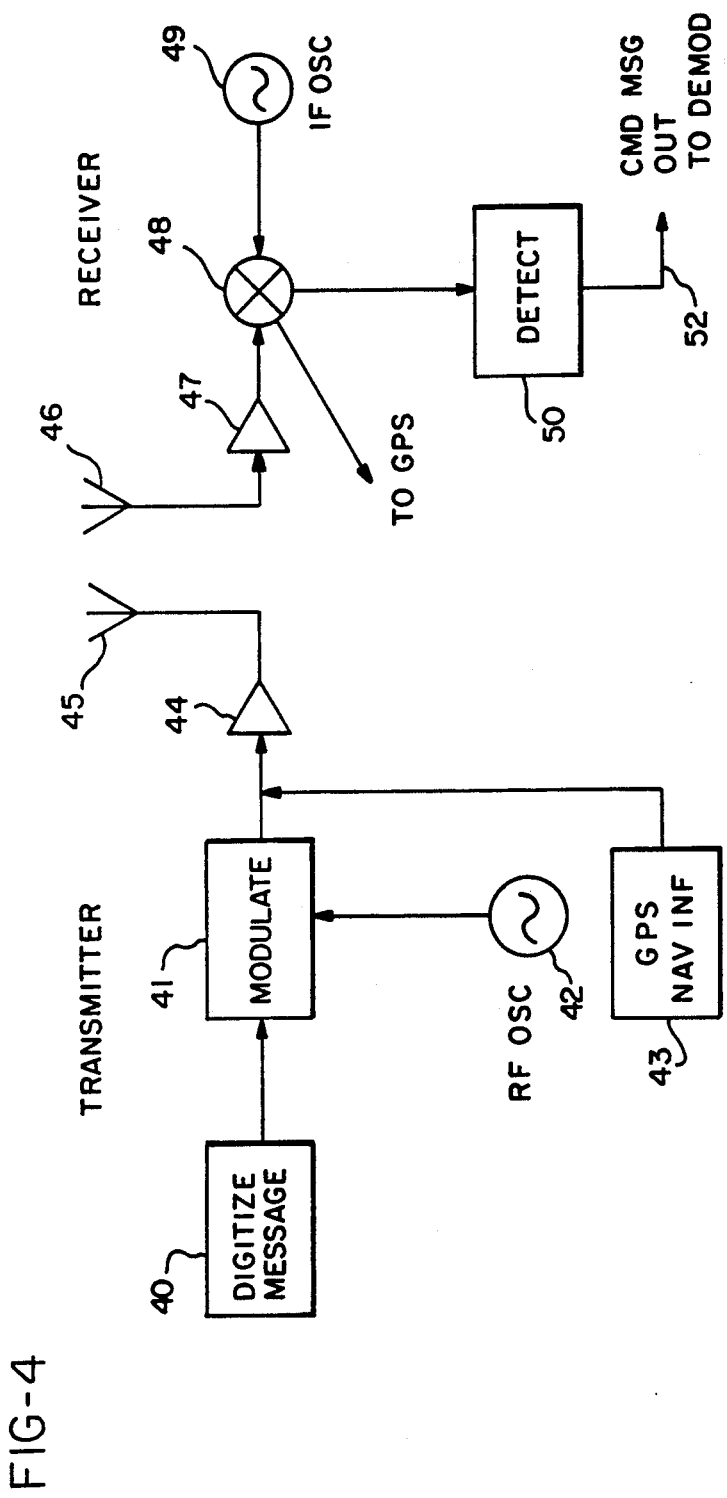
FIG. 4 is a block diagram illustrating the transmitter added functions required for transmission of modulated, non-spread telecommand signals, and the receiver signal flow used in the second alternate embodiment invention.

Referring to FIG. 4, there is shown a block diagram of the proposed added telecommand functions needed for the transmitter and the receiver functional signal flow, all for realization of the first alternate embodiment. The following telecommand circuit functions must be added to the GPS transmitter: a digitizer circuit means 40 for digitizing the input command message, a modulator circuit means 41 and an RF oscillator 42.

The RF oscillator 42 oscillates at one of three preselected frequencies; L1 (1575.42 MHz), L2 (1227.6 MHz) and L3 (1381.05 MHz). Typically, the frequency selected might be the L1 frequency (1575.42 MHz) used by the GPS C/A signal.

Referring to FIG. 4, the command message 40 is sent on a single frequency signal which is not modulated by a spreading code. The command message is then modulated 41 with reference to an input rf oscillator 42 signal. As in the first preferred case, the form of modulation taken by the signal is not important and could be AM, FM or PM. The selected frequency of operation can be either L1 (1575.42 MHz), L2 (1227.6 MHz) or L3 (1381.05 MHz). The modulated command message signal is amplified by a wide band amplifier 44, which is shared with the GPS NAV INF 43 message. The amplifier 44 sends the combined GPS NAV INF and telecommand message signals to the antenna 45 where it is broadcast.

At the GPS receiver, the received signal is down converted and amplified 47. It is then passed to a mixer 48 which also has an IF oscillator 49 input signal frequency.

From the mixer 48, one output is connected to the correlator 3 of the GPS receiver 10, and the other output is connected to a detector 50 (32) in the telecommand components section. The detector 50 (32), detects the telecommand message and outputs a digitized command message signal 52 to the demodulator 33, which demodulates and produces the telecommand message.

As a spread signal is not used in this alternative approach, the method results in a reduction of the time delay from initiation of the command to its execution, as there is no time lost in acquiring and "locking up" on the spreading code in a correlator. This is an advantage of the approach. However, offsetting this advantage, the ground command station or transmitter site will need to broadcast at high power to effect capture of the receiver, as is presently done in today's telecommand systems.

Figure 5:
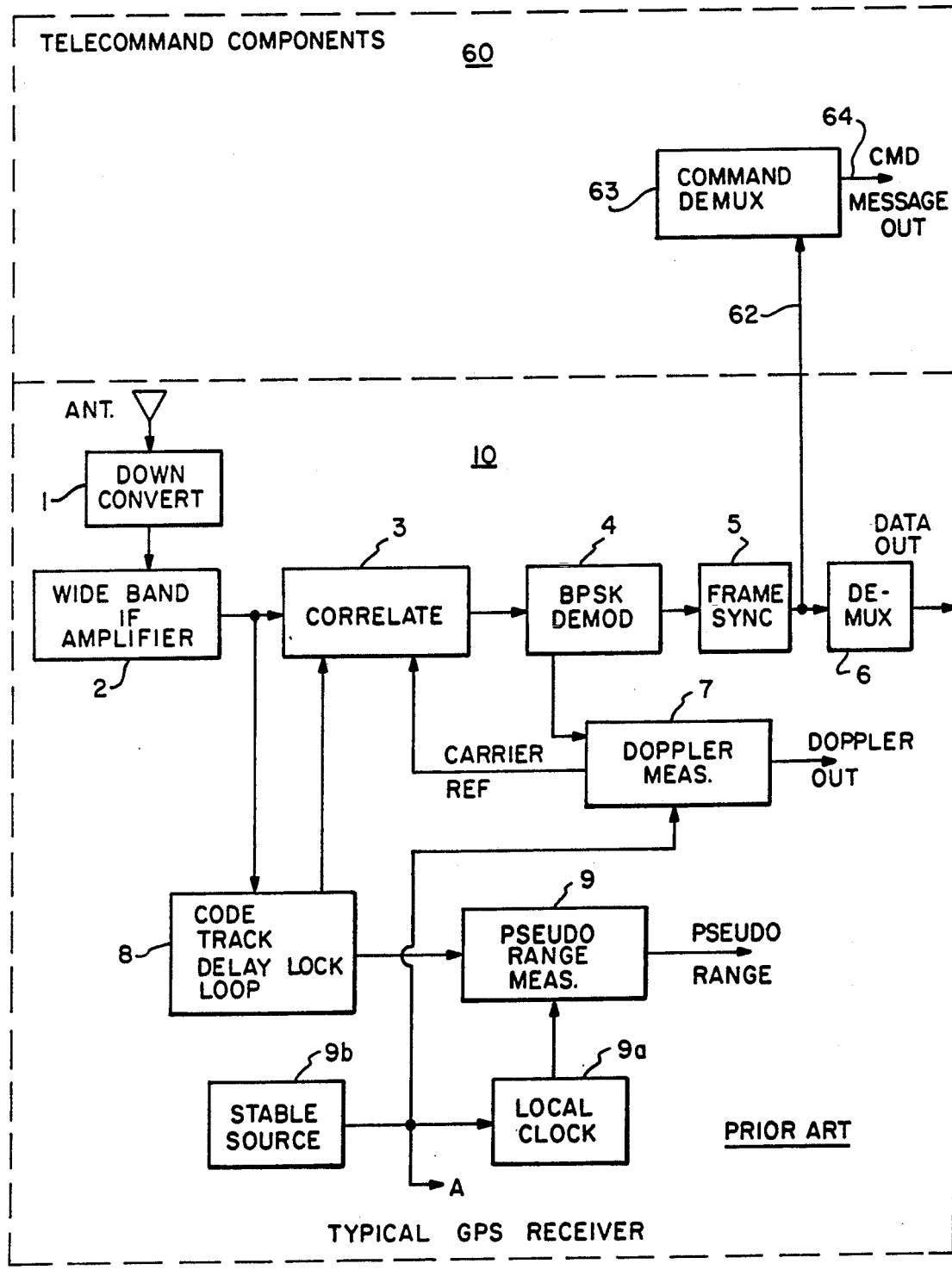
FIG. 5 is a block diagram of the third, alternate embodiment of the invention, particularly showing a single telecommand component added to a typical GPS receiver.

Referring now to FIG. 5, another approach to enabling the use of the GPS system for telecommand messages is shown in the block diagram. In this case, only a command demultiplexer 63 needs to be added. The connection 62 to the GPS receiver 10 is made at the output of the frame synchronizer 5. The command demultiplexer 63 will output 64 the command message for use.

It is proposed that the telecommand message be transmitted using only the present GPS transmission circuitry, and by reformatting the GPS NAV message subframes software to include telecommand message bits in each TLM and HOW word.

Figure 6:
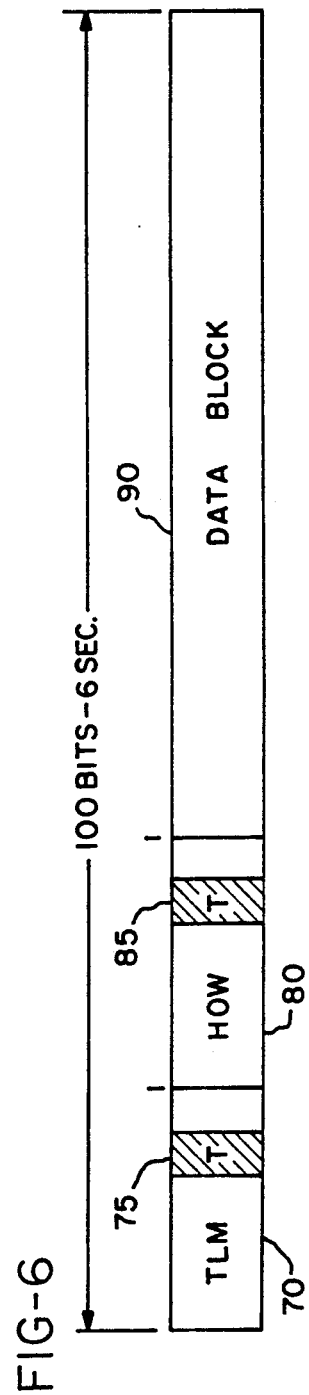
FIG. 6 is a simplified diagram of the GPS Navigation message frame format, particularly showing how telecommand bits may be inserted in the GPS telemetry stream, and useful in explaining operation of the proposed third alternate embodiment of the invention.

Refer to FIG. 6. There are four non information-bearing bits in the GPS telemetry stream, one subframe of which is depicted in FIG. 6. Two bits 75 in the TLM word 70 and two bits 85 in the HOW word 80 can be used for the telecommand message. It will thus be possible to transmit a command message through the existing GPS NAVSTAR satellite network with minimum modification, allowing a global telecommand capability. The bits in the TLM and HOW words were selected because these words occur at the beginning of each subframe, limiting the internal delay to a maximum of six seconds, which is the time to transmit one subframe.

Alternatively, the TLM word 70 or the HOW word 80 can be changed to serve as a flag, or could also incorporate the command message. This approach may be necessary if there is a need for more commands than can be handled by four bits.

As can be seen, in this last alternate approach, the transmission of the telecommand messages can be implemented with software changes only. In the receiver, only an additional demultiplexer is necessary.

ADVANTAGES OF THE PROPOSED APPROACHES

As discussed earlier, the UHF band is crowded, and telecommand exists in this band under a waiver. By using an integrated GPS TSPI/Telecommand system as proposed, not only is telecommand moved out of the 406 MHz to 549 MHz band, but no new bandwidth is needed for telecommand.

A potentially universally compatible telecommand capability can be established at the Test and Training ranges using the integrated system approach. Two of the approaches, the first preferred approach and the third approach significantly improve the security protection presently afforded the telecommand message by the use of DS modulation, which is central to GPS architecture.

Each of the approaches will result in considerable savings in power, space and weight in most unmanned test vehicles, translating into more payload available on the vehicle. Existing methods of providing telecommand information to unmanned vehicles and TSPI information, require duplicate sets of antennas, separate cabling, separate radio units, separate power supplies etc. These would be eliminated by using the GPS onboard system plus only a minimal hardware addition. An integrated GPS TSPI/Telecommand receiver will require not much more power than a unit used for TSPI only, and thus represents a large savings in battery weight over a unit having a separate command receiver. There can also be a reduction in ground equipment as well. If there was an existing "pseudosatellite" ground station supporting GPS TSPI, no additional command transmitter would be needed.

Finally, since the Test and Training Ranges of the U.S. Government have committed themselves to convert from C-Band tracking radars to GPS as the prime means of obtaining TSPI data, this invention offers the advantage of deleting existing separate command systems, both airborne and ground ends, in trade for a slight addition to the TSPI system.

From the above description, it is apparent that the preferred and alternate embodiments achieve the objects of the present invention. Various modifications of the embodiments depicted will be apparent to those skilled in the art. These and other alternatives are considered to be equivalent and within the spirit and scope of the present invention.

Having described the invention, what is claimed is:

1. An improvement to the present Global Positioning System (GPS) of transmitters and receivers, to incorporate a capability of transmitting and receiving telecommand messages; the improvement comprising:
   (a) telecommand processing components added to a GPS receiver; said components comprising a correlator, a single code track delay-lock loop, a doppler measure and a BPSK demodulator;
   said correlator and delay-lock loop being connected to the output of the wide band IF amplifier in said GPS receiver, for performing a despreading function on the received telecommand message;

said doppler measure being connected to the clock source of said GPS receiver and having its output carrier reference signal connected input to said correlator;

said correlator despreading the received spread-spectrum telecommand message and outputting a digitized, filtered telecommand message to the BPSK demodulator; said BPSK demodulator demodulating the telecommand message for use; and (b) telecommand processing components added to a GPS transmitter; said components comprising a digitizer circuit means, a spreader circuit means, an RF oscillatator and a mixer;

said digitizer, digitizing an input telecommand message and presenting a digitized command signal connected to said mixer;

said RF oscillator, operating at one of three selected frequencies: L1: 1575.42 MHz, L2: 1227.6 MHz, or L3: 1381.05 MHz;

said spreader circuit means being connected and synchronized with the clock in said GPS transmitter and also to said RF oscillator, and presenting a spread-spectrum signal at a selected oscillator frequency to said mixer;

said mixer operating on its input digitized telecommand message and spread-spectrum signal to produce a spread-spectrum telecommand message signal for connection to said GPS transmitter circuit wide band amplifier; said amplifier, amplifying said spread spectrum telecommand signal together with its normal input spread GPS NAV information message signal, and transmitting the combined telecommand and GPS NAV signals by antenna.

2. An improvement to the present Global Positioning System (GPS) of transmitters and receivers, to incorporate a capability of transmitting and receiving telecommand messages; the improvement comprising:

(a) telecommand processing components added to a GPS receiver; said components comprising a detector circuit means and a demodulator circuit connected in series;

said detector circuit being connected to the output of the wide band IF amplifier in said GPS receiver, and performing a discriminating function on the received signal, presenting a digitized telecommand message signal to said demodulator circuit;

said demodulator circuit producing the telecommand message from the presented, modulated input signal; and (b) telecommand processing components added to a GPS transmitter; said components comprising a digitizer circuit means, a modulator circuit means, and an RF oscillator;

said digitizer, digitizing an input telecommand message and presenting a digitized command signal connected to said modulator;

said RF oscillator, operating at one of three selected frequencies, L1: 1575.42 MHz, L2: 1227.6 MHz, or L3: 1381.05 MHz, and having its signal output connected to said modulator circuit;

said modulator, operating on its input digitized telecommand message and oscillator signal to produce a modulated telecommand message signal which is connected to said GPS transmitter circuit wide band amplifier;

said amplifier, amplifying said modulated telecommand signal together with its normal input spread-spectrum GPS NAV information message signal, and transmitting the combined telecommand and GPS NAV signals by antenna.

3. An improvement to the present Global Positioning System (GPS) of transmitters and receivers, to incorporate a capability of transmitting and receiving telecommand messages; the improvement comprising:

(a) telecommand processing components added to a GPS receiver; said components comprising a command demultiplexer circuit; said command demultiplexer being connected to the output of the frame synchronizer circuit in said GPS receiver, and separating out the telecommand message signals from the GPS NAV message for use; and (b) reformatting the transmitter GPS NAV message subframes software to include telecommand message bits; said telecommand message bits utilizing two or more bits in each TLM word and two or more bits in each HOW word portion of said GPS NAV message subframes.

* * * * *